United States Patent Office 2,883,378
Patented Apr. 21, 1959

2,883,378

11,18-DIOXYGENATED-Δ⁴-3,20-DIOXO-PREGNENE-21 ALS

Albert Wettstein, Georg Anner, and Julius Schmidlin, Basel, Switzerland, assignors to Ciba Pharmaceutical Products, Inc., Summit, N.J.

No Drawing. Application January 31, 1955
Serial No. 485,326

Claims priority, application Switzerland February 5, 1954

10 Claims. (Cl. 260—239.55)

This invention relates to the manufacture of 11,18-dioxygenated Δ⁴-3,20-dioxo-pregnene-21-als and aldehyde derivatives thereof, and especially to the compound Δ⁴-3,18,20-trioxo-11β-hydroxy-pregnene-21-al and the 18,11-cyclo-semiacetal from thereof. Also embraced within the scope of the invention are the functional derivatives of 11,18-dioxygenated Δ⁴-3,20-dioxo-pregnene-21-als, e.g., the esters, ethers, thioesters, thioethers, thiol- and thionesters, acetals, mercaptals, ketals, enol derivatives, such as enol esters, enol ethers, and enamines, hydrazones, semicarbazones, aldehyde bisulphite compounds and the like.

The new pregnenals are obtained by converting into a free or functionally converted oxo group the free or functionally converted hydroxyl group in the 21-position of a 11,18-dioxygenated Δ⁴-3,20-dioxo-pregnene-21-ol or a functional derivative thereof, and, if desired, liberating the functionally converted hydroxyl and/or oxo groups. Thus, for example, the hydroxyl group in the 21-position can be oxidized to an oxo group. A compound which may be so converted is aldosterone.

In general, the pregnene-21-ols and the derivatives employed as starting materials correspond to the final products defined above. They may be of any desired steric configuration and can be prepared, for example, by the processes described in the following U.S. applications: T. Reichstein, Ser. No. 444,657, filed July 20, 1954; T. Reichstein et al., Ser. No. 454,834, filed September 8, 1954; T. Reichstein et al., Ser. No. 480,061, filed January 5, 1955; and T. Reichstein et al., Ser. No. 480,062, filed January 5, 1955.

According to one process of carrying out the invention, a quaternary 11,18-dioxygenated Δ⁴-3,20-dioxo-pregnene-21-yl-ammonium compound or a functional derivative thereof is reacted with an organic nitroso-compound, and the aldehyde liberated from the resulting nitrone. For this purpose there are used more especially quaternary salts which are derived from heterocyclic bases of aromatic character, such as pyridine, quinoline, and isoquinoline. The starting materials are obtained by reacting a tertiary amine with an ester of the corresponding 21-hydroxy-pregnene compound with a strong inorganic acid, such as a hydrohalic acid or an organic sulfonic acid. For reaction with the quaternary salts there are used more especially nitroso compounds of the aromatic series, such as nitroso benzene and dialkylamino-nitroso benzenes, for example, para-dimethlamino-nitrosobenzene. The nitrones are formed in the presence of an alkaline agent. It has been unexpectedly found that the condensation takes place even in the presence of bicarbonates of alkali metals, for example, potassium bicarbonate, in excellent yield. The aldehydes can be liberated from the nitrones obtained by the process by treatment with an acid agent, if desired in the presence of a carbonyl compound. The same result can be obtained by reaction with an oxo-carboxylic acid, such as pyroracemic acid.

An alternative process comprises treating the said 11,18-dioxygenated Δ⁴-3,20-dioxo-pregnene-21-ols with an oxidizing agent, which converts an acyloin into a dioxo-compound. For this purpose there are suitable cupric salts, especially cupric acetate, bismuth oxide or oxygen in the presence of a metal catalyst such as an alcohol-soluble metal salt, for example, in the presence of copper or iron salts, advantageously cupric acetate or ferric chloride. The reaction is advantageously carried out in a solvent, such as methanol, ethanol, propanol or acetone, and is advantageously carried out at a raised temperature, for example, at about 50° C.

The products of the process can be used as medicaments having the action of suprarenal cortex hormones for example of aldosterone and are useful in these cases where aldosterone is employed. They are also useful as intermediate products for making such steroid medicaments. The compounds can be administered orally or parenterally in a carrier which facilitates administration.

The following examples illustrate the invention:

*Example 1*

A solution of 0.1 mg. of cupric acetate in 5 cc. of water and 1 drop of glacial acetic acid is added to a solution of 5 mg. of aldosterone hydrate in 0.7 cc. of very pure methanol. Air is blown for 12 hours through the solution heated at about 50°. The reaction mixture is then diluted with a small quantity of water, the methanol is evaporated in vacuo, further water is added, and the mixture is again concentrated in vacuo. From the concentrated aqueous solution there crystallizes after cooling, in ice, the hydrate of Δ⁴-3,18,20-trioxo-11β-hydroxy-pregnene-21-al which can be represented by the following formulae in equilibrium with one another:

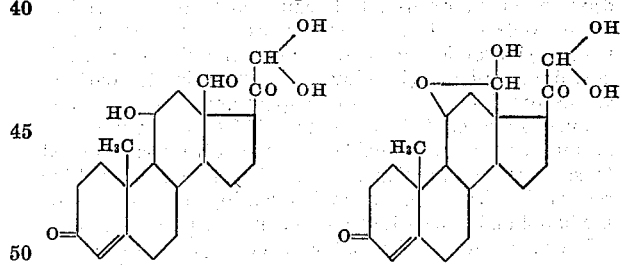

By reacting the hydrate in methanol-solution with an equivalent quantity of sodium bisulphite in water a sodium bisulphite addition compound of the above pregnene-21-al is obtained. The latter is hygroscopic and is distinguished by its good solubility in water.

*Example 2*

5 mg. of Δ⁴-3,20-dioxo-11β,18,21-trihydroxy-pregnene-18-monoacetate are treated with air and cupric acetate as described in Example 1, except that the oxidation is carried on for 24 hours. After working up in the manner described in Example 1 the hydrate of Δ⁴-3,20-dioxo-11β-hydroxy-18-acetoxy-pregnene-21-al is obtained.

In order to hydrolyze the acetoxy group in the 18-position 4 mg. of the above pregnene-21-al are dissolved in 0.7 cc. of methanol, after the addition of 5 mg. of potassium bicarbonate in 0.15 cc. of water the mixture is melted in a tube in vacuo and maintained for 2 days at about 20° C. The contents of the tube are then freed from methanol in vacuo, whereupon there precipitates from the aqueous solution $\Delta^4$-3,20-dioxo-11$\beta$,18-dihydroxy-pregnene-21-al which is represented by the following formulae in equilibrium with one another:

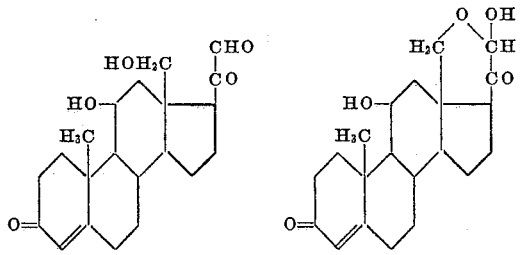

The starting material used above may be prepared, for example, as follows:

20 mg. of $\Delta^4$-3,20-dioxo-11$\beta$,18,21-trihydroxy-pregnene [obtained, for example, as described in the application of T. Reichstein et al., Ser. No. 480,061, filed January 5, 1955] are dissolved in 0.3 cc. of dry pyridine, the solution is mixed at 0° C. with 200 mg. of acetic anhydride and allowed to stand for 2 days at 25° C. The reaction mixture is poured into ice-water and extracted with ether-chloroform (4:1). After washing, drying and evaporating the solvent there is obtained $\Delta^4$-3,20-dioxo-11$\beta$-hydroxy-18,21-diacetoxy-pregnene, which can be partially hydrolyzed as follows: 5 mg. of potassium bicarbonate in 0.35 cc. of water are added to a solution of 8 mg. of the diacetate in 1.3 cc. of methanol, and, after being sealed in a tube, the mixture is allowed to stand for 48 hours in vacuo at 20° C. The contents of the tube are worked up in the manner described above for the isolation of the diacetate and there is obtained $\Delta^4$-3,20-dioxo-11$\beta$,18,21 - trihydroxy - pregnene - 18 - monoacetate, which can be purified by recrystallization from mixtures of acetone, ether and petroleum ether.

In a manner analogous to that described in Example 1 $\Delta^4$-3,11,20-trioxo-18,21-dihydroxy-pregnene can be oxidized to $\Delta^4$-3,11,20-trioxo-18-hydroxy-pregnene-21-al or its 18,2-cyclo-semiacetal. It is obtained from aqueous solvents in the form of its hydrate.

*Example 3*

18 mg. of aldoesterone ($\Delta^4$-3,18,20-trioxy-11$\beta$,21-dihydroxy-pregnene or its 18,11-semiacetal) are dissolved in an ampoule in 0.1 cc. of anhydrous pyridine, 18 mg. of para-tosyl bromide are added, and after the ampoule is closed the mixture is allowed to stand in the dark in vacuo for 7 days at room temperature. The ampoule is opened and cooled to —60 to —70° C. in a mixture of acetone and carbon dioxide, and the solvent is removed by sublimation in a high vacuum. The thawed crystalline residue is stirred with a small quantity of a mixture of methanol and ether (3:1) and the mother liquor is filtered off with suction. The yellowish crystals of $\Delta^4$-3,18,20-trioxo-11$\beta$-hydroxy-pregnene-21-yl-pyridinium salt or its 18,11-semiacetal are dried in vacuo at 40° C.

To a solution of 23 mg. of the crude pyridinium salt and 8 mg. of para-nitroso-dimethylaniline in 1.0 cc. of methanol and 0.75 cc. of water there is added 0.25 cc. of an 0.2-molar aqueous solution of sodium hydrogen carbonate, and after fusion the mixture is allowed to stand in the dark for 72 hours in vacuo. The mother liquor is then filtered off with suction, the red platelets of the precipitated ($\Delta^4$-3,18-dioxo-11$\beta$-hydroxy-etienoyl)-N-(para-dimethylamino-phenyl)-nitrone or its 18,11-semiacetal are washed with methanol of 40 percent strength and water, and dried in vacuo over calcium chloride.

17 mg. of the crystalline nitrone are agitated at 0° C. with 0.5 cc. of ether saturated 2 N-hydrochloric acid for 2 hours in an atmosphere of nitrogen. In this manner there is finally obtained an almost colorless crystalline suspension. By filtering off with suction, washing the filter residue with ice-cold water saturated with ether, and drying it in vacuo over calcium chloride there is obtained the hydrate of $\Delta^4$-3,18,20-trioxo-11$\beta$-hydroxy-pregnene-21-al described in Example 1.

What is claimed is:

1. A member selected from the group consisting of a compound of the formula:

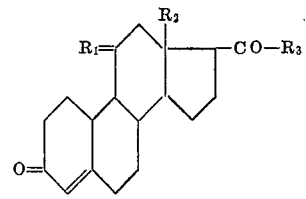

in which formula $R_1$ represents a member selected from the group consisting of (1) a free oxo group, (2) a free hydroxy group together with a hydrogen atom, and (3) an oxygen atom linked with the 18-carbon atom together with a hydrogen atom, $R_2$ a member selected from the group consisting of a free hydroxymetal group, a hydroxymethyl esterified with a lower aliphatic carboxylic acid, a hydroxymethyl group acetalized with a 21-aldehyde group, a free aldehyde group, and aldehyde group acetalized with the 11-hydroxy group, and $R_3$ represents a member selected from the group consisting of an aldehyde group, a hydrated aldehyde group and a bisulfite addition salt of an aldehyde group.

2. The bisulphite addition products of the compounds of claim 1.

3. A member of the group consisting of $\Delta^4$-3,18,20-trioxo-11$\beta$-hydroxy-pregnene-21-al, the hydrate and the 18,11-cyclo-semiacetal thereof.

4. A member of the group consisting of the bisulphite addition compounds of $\Delta^4$-3,18,20-trioxo-11$\beta$-hydroxy-pregnene-21-al and the 18,11-cyclo-semiacetal form thereof.

5. A member of the group consisting of $\Delta^4$-3,20-dioxo-11$\beta$-hydroxy-18-acetoxy-pregnene-21-al and the hydrate thereof.

6. A member of the group consisting of $\Delta^4$-3,20-dioxo-11$\beta$,18-dihydroxy-pregnene-21-al and the 18,21-cyclo-semiacetal form thereof.

7. A member of the group consisting of $\Delta^4$-3,11,20-trioxo-18-hydroxy-pregnene-21-al, the 18,21-cyclo-semiacetal form and the hydrate thereof.

8. A compound of claim 1, wherein $R_3$ is a phenyl nitrone group.

9. A compound of claim 1, wherein $R_3$ is a dimethylamino-phenyl nitrone group.

10. $\Delta^4$ - 3,18 - dioxo - 11$\beta$ - hydroxy - etienoyl) - N - (paradimethylamino-phenyl)-nitrone.

References Cited in the file of this patent

Experientia, vol. 10, pages 132–135, S. A. Simpson et al., 1954.

UNITED STATES PATENT OFFICE
CERTIFICATE OF CORRECTION

Patent No. 2,883,378                                              April 21, 1959

Albert Wettstein et al.

It is hereby certified that error appears in the printed specification of the above numbered patent requiring correction and that the said Letters Patent should read as corrected below.

Column 3, line 48, for "aldoesterone" read -- aldosterone --; same line 48, for "-trioxy-" read -- -trioxo---; column 4, line 31, for "hydroxymetal" read -- hydroxymethyl --.

Signed and sealed this 18th day of August 1959.

(SEAL)

Attest:

KARL H. AXLINE
Attesting Officer

ROBERT C. WATSON
Commissioner of Patents